United States Patent
Kiyono et al.

(10) Patent No.: US 7,359,149 B2
(45) Date of Patent: Apr. 15, 2008

(54) COMPOSITE TYPE THIN-FILM MAGNETIC HEAD WITH REDUCED CAPACITANCE BETWEEN LEADS FOR READ AND WRITE HEAD ELEMENTS

(75) Inventors: Hiroshi Kiyono, Tokyo (JP); Yosuke Antoku, Tokyo (JP); Tsuyoshi Umehara, Tokyo (JP); Yoshikazu Sawada, Tokyo (JP)

(73) Assignee: TDK Corporation, Tokyo (JP)

( * ) Notice: Subject to any disclaimer, the term of this patent is extended or adjusted under 35 U.S.C. 154(b) by 334 days.

(21) Appl. No.: 11/079,735

(22) Filed: Mar. 15, 2005

(65) Prior Publication Data
US 2005/0219751 A1 Oct. 6, 2005

(30) Foreign Application Priority Data
Mar. 31, 2004 (JP) .............................. 2004/103865

(51) Int. Cl.
G11B 5/39 (2006.01)
G11B 5/127 (2006.01)
(52) U.S. Cl. .................... 360/126; 360/234.5; 360/322
(58) Field of Classification Search ............. 360/234.5, 360/317, 322, 126
See application file for complete search history.

(56) References Cited

U.S. PATENT DOCUMENTS

| 6,603,623 | B1 | 8/2003 | Fontana et al. |
| 6,687,976 | B1 | 2/2004 | Koyama et al. |
| 6,892,442 | B2* | 5/2005 | Sasaki ..................... 29/603.07 |
| 6,928,721 | B2* | 8/2005 | Chhabra et al. ......... 29/603.07 |
| 7,088,543 | B2* | 8/2006 | Satoh et al. .................. 360/75 |
| 7,092,212 | B2* | 8/2006 | Onodera .................. 360/234.5 |
| 2005/0180053 | A1* | 8/2005 | Dovek et al. ............... 360/246 |
| 2006/0082929 | A1* | 4/2006 | Kiyono et al. ............. 360/317 |
| 2006/0171076 | A1* | 8/2006 | Lille ........................ 360/234.5 |

(Continued)

FOREIGN PATENT DOCUMENTS

JP 06-180823 6/1994

(Continued)

OTHER PUBLICATIONS

Chinese Office Action, with English-Language Translation, dated Oct. 13, 2006.

(Continued)

*Primary Examiner*—Jefferson Evans
(74) *Attorney, Agent, or Firm*—Frommer Lawrence & Haug LLP

(57) ABSTRACT

A composite type thin-film magnetic head is provided, which comprises: a write head element; a pair of terminal pads for the write head element; a pair of lead conductors for the write head element, electrically connecting the write head element to the pair of terminal pads for the write head element; a read head element; a pair of terminal pads for the read head element; and a pair of lead conductors for the read head element, electrically connecting the read head element to the pair of terminal pads for the read head element. The pair of lead conductors for the write head element and the pair of lead conductors for the read head element are formed into patterns that have no overlapped portions with each other through only an insulating layer.

5 Claims, 5 Drawing Sheets

U.S. PATENT DOCUMENTS

2006/0176618 A1* 8/2006 Kagami et al. ............. 360/319
2006/0198057 A1* 9/2006 Leung et al. ............... 360/323
2006/0219765 A1* 10/2006 Snyder ...................... 229/117

FOREIGN PATENT DOCUMENTS

JP          2001-034910          2/2001
JP          2004-005775          1/2004

OTHER PUBLICATIONS

Klass B. Klassen et al., "Write to Read Coupling", IEEE Transactions on Magnetics, vol. 38, No. 1, pp. 61-67 Jan. 2002.

* cited by examiner

COMPOSITE TYPE THIN-FILM MAGNETIC HEAD WITH REDUCED CAPACITANCE BETWEEN LEADS FOR READ AND WRITE HEAD ELEMENTS

PRIORITY CLAIM

This application claims priority from Japanese patent application No.2004-103865, filed on Mar. 31, 2004, which is incorporated herein by reference.

BACKGROUND OF THE INVENTION

1. Field of the Invention

The present invention relates to a composite type thin-film magnetic head comprising a write head element and a read head element.

2. Description of the Related Art

Recently, in order to satisfy the demand for larger capacity and more downsizing of a hard disk drive apparatus (HDD), higher recording density in a magnetic disk and more miniaturization of a head gimbal assembly (HGA) including a magnetic head are intended to be achieved.

The more miniaturization of the HGA, however, causes a problem of crosstalk between a writing side and a reading side. Especially, more miniaturization of a magnetic head element causes an increase in density of a current flowing through the element due to a decrease in a cross section area of the element, as well as a decrease in heat dispersion. Moreover, higher write frequency results in a steep change in voltage applied to the write head element. Consequently, a crosstalk occurs from the writing side to the reading side, which brings a tendency toward degradation of the characteristics in the read head element.

A technique to reduce a crosstalk between trace conductors in the writing side and in the reading side is proposed in Klaas B. Klaassen et al., "Write-to-Read Coupling", IEEE Trans. Magn. Vol.38, pp61-67, January 2002, which analyzes a coupling mechanism between the trace conductors formed on a suspension. In the description, it is described that the crosstalk between the writing side and the reading side is caused mainly by a capacitive coupling between the trace conductors in the writing side and in the reading side because the crosstalk has a differential waveform of a write voltage. Further, it is concluded that almost all crosstalk is caused by the coupling between the trace conductors, not by an inner coupling in the magnetic head.

However, the inventors achieve the present invention in consequence of analyses and investigations based on the thought that the inner coupling must have a great influence on the crosstalk between the writing side and the reading side, as well as the coupling between the trace conductors.

BRIEF SUMMARY OF THE INVENTION

It is therefore an object of the present invention to provide a composite type thin-film magnetic head that can greatly reduce the crosstalk between the writing side and the reading side.

A composite type thin-film magnetic head according to the present invention comprises: a write head element; a pair of terminal pads for the write head element; a pair of lead conductors for the write head element, electrically connecting the write head element to the pair of terminal pads for the write head element; a read head element; a pair of terminal pads for the read head element; and a pair of lead conductors for the read head element, electrically connecting the read head element to the pair of terminal pads for the read head element. Especially, according to the present invention, the pair of lead conductors for the write head element and the pair of lead conductors for the read head element are formed into patterns that have no overlapped portions with each other through only an insulating layer, or formed into patterns where the pair of lead conductors for the write head element and the pair of lead conductors for the read head element have overlapped portions with each other through only an insulating layer and capacitances between each of the lead conductors for the write head element and the lead conductor for the read head element have values of 0.1 pF or less.

The overlapped portions between the lead conductors for the write head element and for the read head element through an insulating layer cause large capacitances between them to be generated, and the capacitances bring about a crosstalk voltage in the read head element, which corresponds to rising and/or trailing edges of the write voltage applied to the write head element. However, by patterning the lead conductors for the write head element and for the read head element so that such overlapped portions do not exist, the capacitances between them are decreased, and therefore, the crosstalk voltage can be prevented from being generated, or greatly reduced. Even in the case where portions of the lead conductors for the write head element and for the read head element are overlapped with each other through only an insulating layer, the generation of the crosstalk voltage can be greatly reduced by forming the lead conductor's patterns so that the capacitances between the lead conductors have values of 0.1 pF or less.

The great reduction of the direct crosstalk from the write head element to the read head element can prevent a decrease in operating life of the read head element due to an enhancement of electromigration, and can also prevent a degradation of magnetic properties due to an enhancement of an interlayer diffusion of metal atoms in the case where the read head element is formed of a multilayered film.

Preferably, an area of the overlapped portions and a distance between the overlapped portions are set so that capacitances between each of said lead conductors for the write head element and the lead conductor for the read head element have values of 0.1 pF or less.

It is preferred that the read head element is a magnetoresistive (MR) read head element in which a sense current flows in a direction parallel with surfaces of layers of the element. Further, more preferably, the MR read head element is a giant magnetoresistive (GMR) read head element.

It is also preferred that the write head element is an inductive write head element.

Further objects and advantages of the present invention will be apparent from the following description of preferred embodiments of the invention as illustrated in the accompanying drawings.

DETAILED DESCRIPTION OF THE INVENTION

Figure 1:
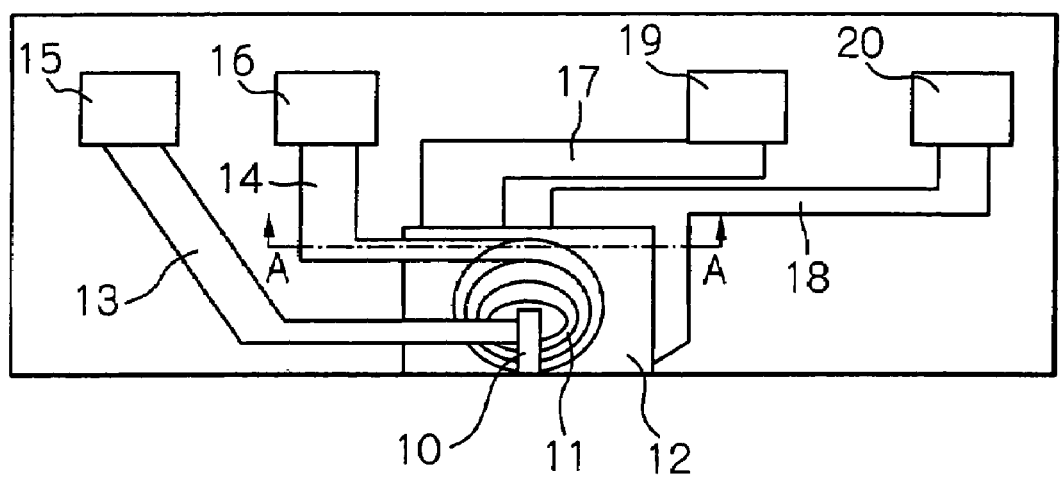
FIG. 1 shows an elevation view of a magnetic head slider mounting a composite type thin-film magnetic head as an embodiment according to the present invention from the element-formed surface side, schematically illustrating a structure of the composite type thin-film magnetic head.
Figure 2:
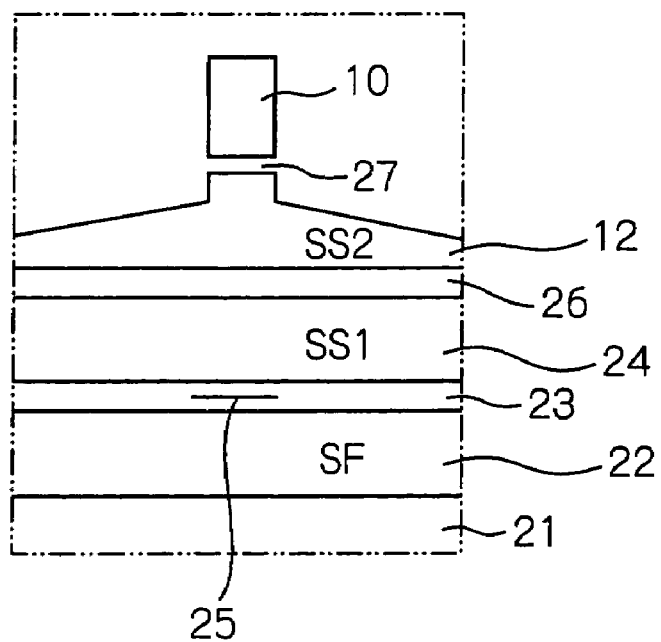
FIG. 2 shows a cross-sectional view from an air bearing surface (ABS) side, illustrating a layered structure of a head element part of the composite type thin-film magnetic head.
Figure 3:
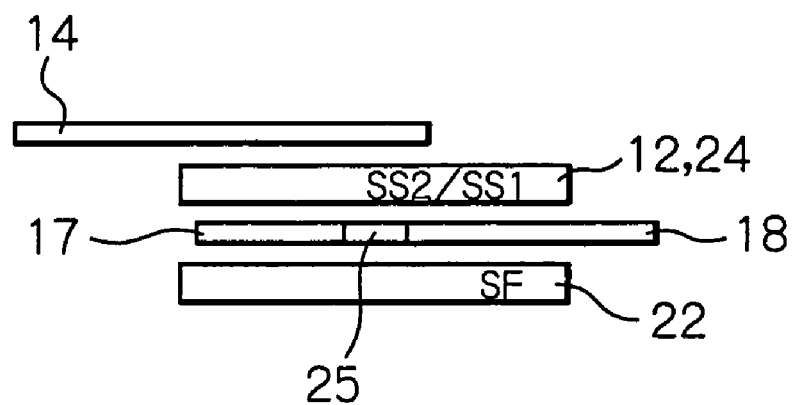
FIG. 3 shows a cross-sectional view from the ABS side taken along line A-A, illustrating a layered structure of a lead conductor part of the composite type thin-film magnetic head shown in FIG. 1.

FIG. 1 shows an elevation view of a magnetic head slider mounting a composite type thin-film magnetic head as an embodiment according to the present invention from the element-formed surface side, schematically illustrating a structure of the composite type thin-film magnetic head, FIG. 2 shows a cross-sectional view from an air bearing surface (ABS) side, illustrating a layered structure of a head element part of the composite type thin-film magnetic head, and FIG. 3 shows a cross-sectional view from the ABS side taken along line A-A shown in FIG. 1, illustrating a layered structure of a lead conductor part of the composite type thin-film magnetic head.

In FIG. 1, reference numeral 10 indicates an upper magnetic pole layer of an inductive write head element, 11 indicates a coil conductor, 12 indicates a lower magnetic pole layer, 13 and 14 indicate a pair of lead conductors for the write head element, one ends of which are electrically connected to both ends of the coil conductor 11 respectively, 15 and 16 indicate a pair of terminal pads for the write head element, which are electrically connected to other ends of the pair of lead conductors 13 and 14 for the write head element respectively, 17 and 18 indicate a pair of lead conductors for the read head element, one ends of which are electrically connected to both ends of an MR or a GMR read head element that is not shown in the figure respectively, and 19 and 20 indicate a pair of terminal pads for the read head element, which are electrically connected to other ends of the pair of lead conductors 17 and 18 for the read head element respectively. The read head element according to the present embodiment is an MR or a GMR read head element with a current-in-plane (CIP) structure where a sense current flows in a parallel direction with surfaces of layers of the element.

As shown in FIG. 2, a head element part has a layered structure including a lower shield layer (SF) 22 stacked on a substrate that is not shown in the figure through an insulating layer 21, an upper shield layer (SS1) 24 stacked on the lower shield layer 22 through an shield gap layer 23, an MR or a GMR layer 25 intercalated between the lower shield layer 22 and the upper shield layer 24 through the shield gap layer 23, a lower magnetic pole layer (SS2) 12 stacked on the upper shield layer 24 through an insulating layer 26, and an upper magnetic pole layer 10 opposed to the lower magnetic pole layer 12 through a gap layer 27.

As shown in FIG. 3, the lead conductor 14 for the write head element is not opposed to the lead conductor 17 for the read head element, directly through only an insulating layer, that is, in an exterior area of the upper shield layer 24 and the lower magnetic pole layer 12. The lead conductor 14 for the write head element and the lead conductor 17 for the read head element are overlapped with each other through the upper shield layer 24 and the lower magnetic pole layer 12, only in the area where the upper shield layer 24 and the lower magnetic pole layer 12 exist. Therefore, the pair of lead conductors 13 and 14 for the write head element is not opposed to the pair of lead conductors 17 and 18 for the read head element directly through only an insulating layer.

Figure 4:
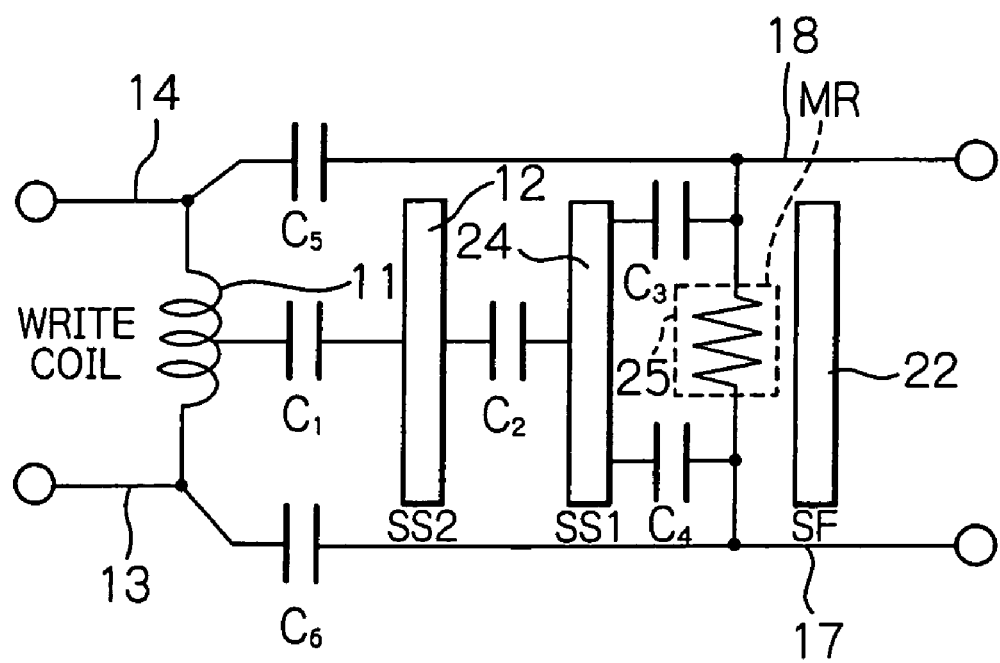
FIG. 4 shows a schematic equivalent circuit of the composite type thin-film magnetic head shown in FIG. 1.

FIG. 4 shows a schematic equivalent circuit of the composite type thin-film magnetic head shown in FIG. 1.

In the figure, reference symbol $C_1$ indicates a stray capacitance generated between a coil conductor 11 and the lower magnetic pole layer (SS2) 12 of the inductive write head element, $C_2$ indicates a stray capacitance generated between the lower magnetic pole layer (SS2) 12 and the upper shield layer (SS1) 24, $C_3$ and $C_4$ indicate stray capacitances generated respectively between the upper shield layer (SS1) 24 and respective lead conductors 17 and 18 for the read head element, and $C_5$ and $C_6$ indicate stray capacitances generated between the lead conductors 13 and 14 for the write head element and the lead conductors 17 and 18 for the read head element respectively.

Figure 5:
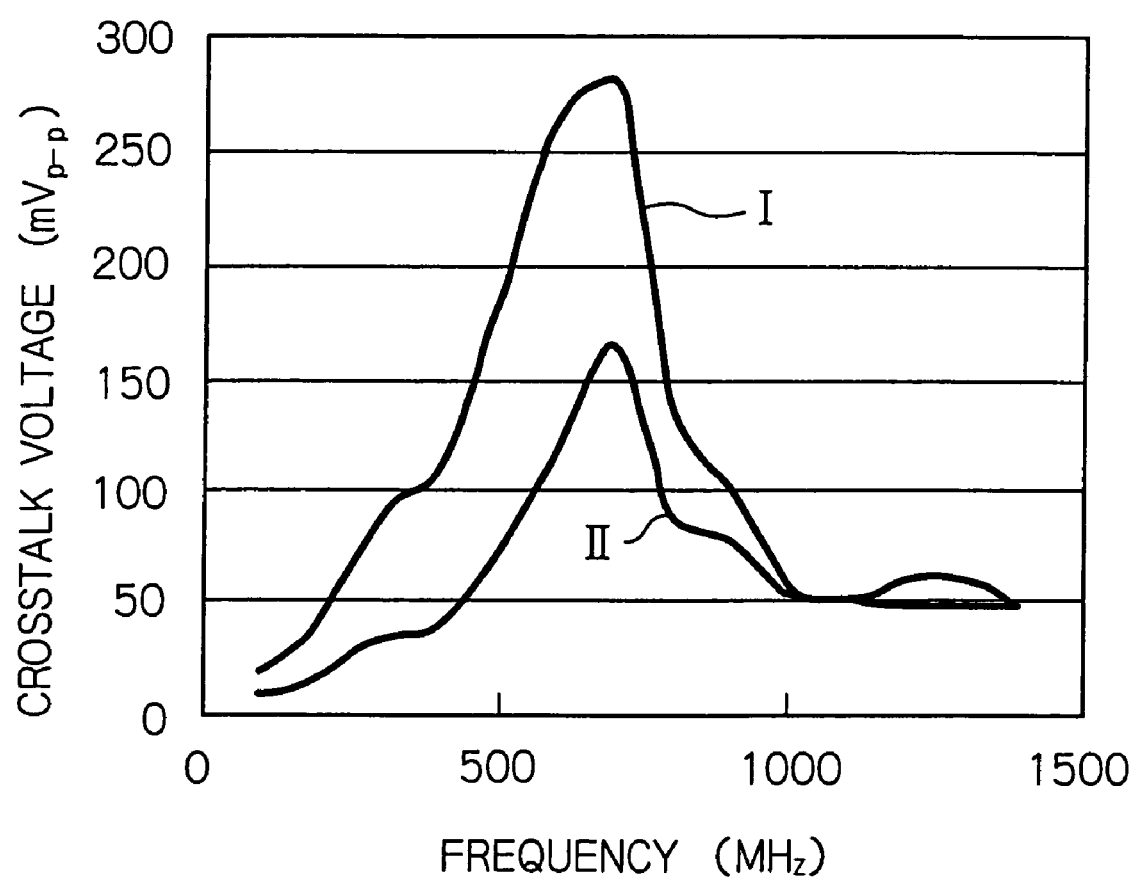
FIG. 5 shows a characteristic graph illustrating the relation between the frequency and the crosstalk voltage in the composite type thin-film magnetic head shown in FIG. 1 and a conventional thin-film magnetic head.

In the structure according to the present embodiment, because the lead conductors for the write head element are not opposed to the lead conductors for the read head element directly through only the insulating layer, the both capacitances $C_5$ and $C_6$ between the lead conductors for the write head element and for the read head element have much less values than those in the conventional art. The much less values of the both capacitances $C_5$ and $C_6$ effect a great decrease in the crosstalk voltage generated in the read head element, which corresponds to rising and/or trailing edges of the write voltage applied to the coil conductor 11 during a write operation. FIG. 5 shows a characteristic graph illustrating the effect. The lateral axis of the graph indicates a frequency (MHz), the longitudinal axis indicates a crosstalk voltage ($mV_{P-P}$), reference symbol I indicates a characteristic of a thin-film magnetic head where the both capacitances $C_5$ and $C_6$ become large because portions of the lead conductors for the write head element are opposed to portions of the lead conductor for the read head element directly through the insulating layer as well as the conventional art, and II indicates a characteristic of a thin-film magnetic head according to the present embodiment. In a frequency range for the practical use, the characteristic II according to the present embodiment shows a rather less crosstalk voltage than that of the characteristic I according to the conventional art.

The great reduction of the direct crosstalk from the write head element to the read head element, as shown in the present embodiment, can prevent a decrease in operating life of the read head element due to an enhancement of electromigration, and can also prevent a degradation of magnetic properties due to an enhancement of an interlayer diffusion of metal atoms in the case of the GMR read head element.

Figure 6:
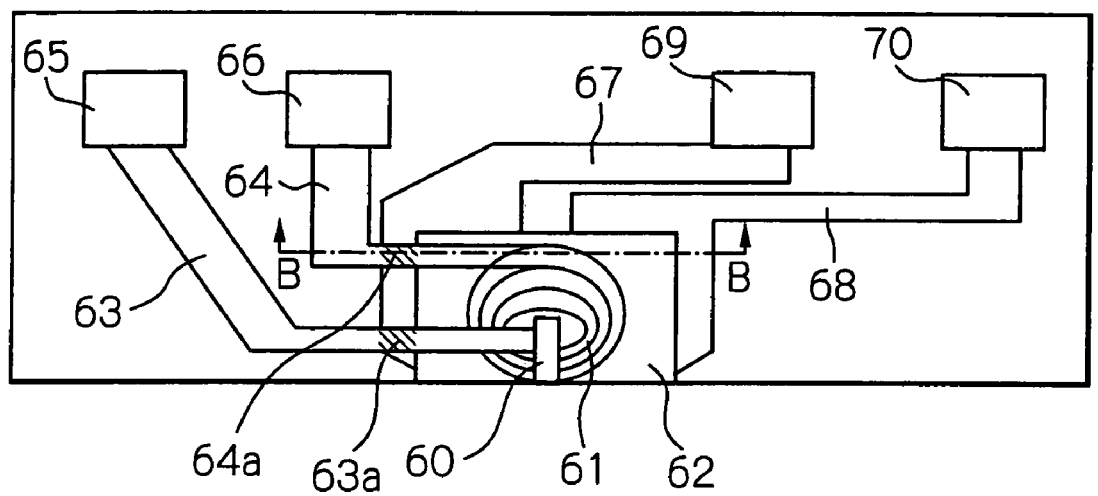
FIG. 6 shows an elevation view of a magnetic head slider mounting a composite type thin-film magnetic head as another embodiment according to the present invention from the element-formed surface side, schematically illustrating a structure of the composite type thin-film magnetic head.
Figure 7:
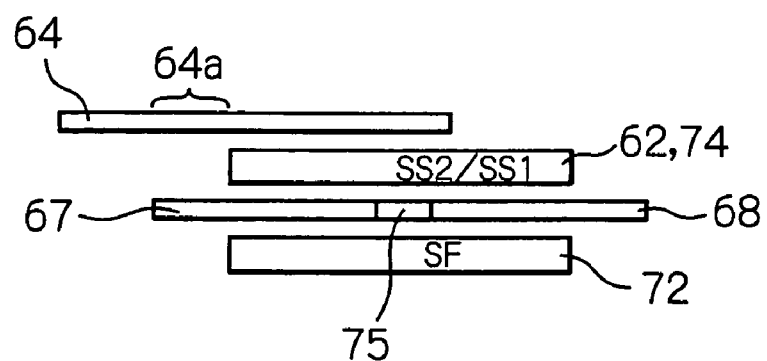
FIG. 7 shows a cross-sectional view from the ABS side taken along line B-B, illustrating a layered structure of a lead conductor part of the composite type thin-film magnetic head shown in FIG. 6.
Figure 8A:
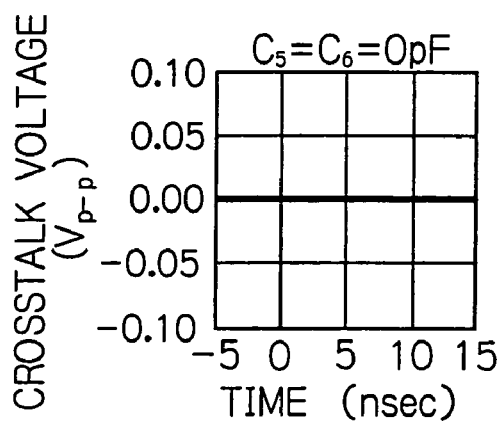
FIGS. 8a to 8e show characteristic graphs illustrating the relations between time and the crosstalk voltage at various values of the capacitances $C_5$ and $C_6$ between the lead conductors for the write head element and for the read head element in the composite type thin-film magnetic head shown in FIG. 6.
Figure 8D:
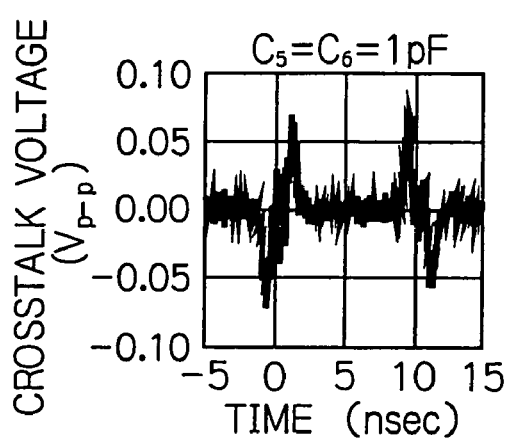
Figure 8B:
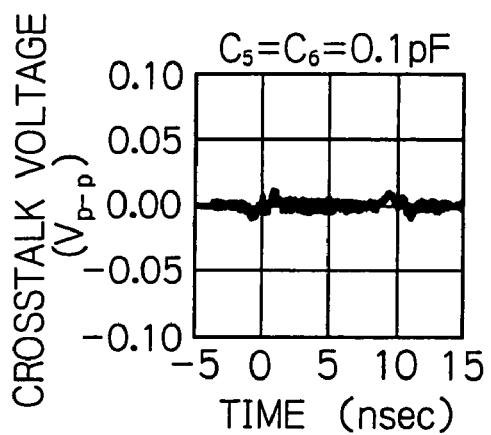
Figure 8E:
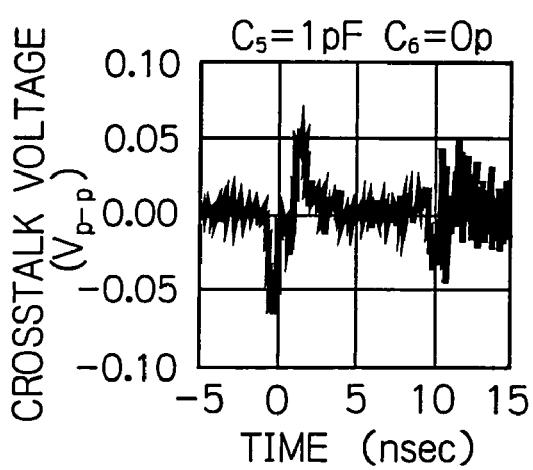
Figure 8C:
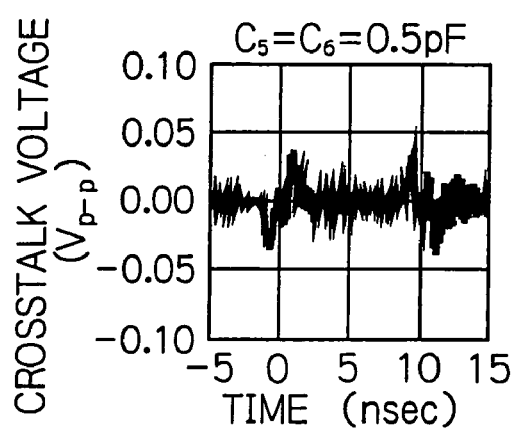

FIG. 6 shows an elevation view of a magnetic head slider mounting a composite type thin-film magnetic head as another embodiment according to the present invention from the element-formed surface side, schematically illustrating a structure of the composite type thin-film magnetic head, and FIG. 7 shows a cross-sectional view from the ABS side taken along line B-B shown in FIG. 6, illustrating a layered structure of a lead conductor part of the composite type thin-film magnetic head.

In FIG. 6, reference numeral 60 indicates an upper magnetic pole layer of an inductive write head element, 61 indicates a coil conductor, 62 indicates a lower magnetic pole layer, 63 and 64 indicate a pair of lead conductors for the write head element, one ends of which are electrically connected to both ends of the coil conductor 61 respectively, 65 and 66 indicate a pair of terminal pads for the write head element, which are electrically connected to other ends of the pair of lead conductors 63 and 64 for the write head element respectively, 67 and 68 indicate a pair of lead conductors for the read head element, one ends of which are electrically connected to both ends of an MR or a GMR read head element that is not shown in the figure respectively, and 69 and 70 indicate a pair of terminal pads for the read head element, which are electrically connected to other ends of the pair of lead conductors 67 and 68 for the read head element respectively. The read head element according to the present embodiment is also an MR or a GMR read head element with a CIP structure where a sense current flows in a parallel direction with surfaces of layers of the element.

In the present embodiment, a head element part also has a layered structure, as well as that shown in FIG. 2, including a lower shield layer (SF) 72 stacked on a substrate that is not shown in the figure through an insulating layer, an upper shield layer (SS1) 74 stacked on the lower shield layer 72 through an shield gap layer, an MR or a GMR layer 75 intercalated between the lower shield layer 72 and the upper shield layer 74 through the shield gap layer, a lower magnetic pole layer (SS2) 62 stacked on the upper shield layer 74 through an insulating layer, and an upper magnetic pole layer 60 opposed to the lower magnetic pole layer 62 through a gap layer.

As shown in FIGS. 6 and 7, in the present embodiment, portions 63a and 64a of the lead conductors 63 and 64 for the write head element are opposed respectively to portions of the lead conductor 67 for the read head element, directly through only the insulating layer, that is, in an exterior area of the upper shield layer 74 and the lower magnetic pole layer 62. In other words, respective lead conductors 63 and 64 for the write head element and the lead conductor 67 for the read head element are overlapped with each other through the upper shield layer 74 and the lower magnetic pole layer 62 in the area where the upper shield layer 74 and the lower magnetic pole layer 62 exist, and respective portions 63a and 64a and the lead conductor 67 are overlapped with each other through only the insulating layer, also in the area where the upper shield layer 74 and the lower magnetic pole layer 62 do not exist. Further, in the present embodiment, the area of the opposed portions is set to less value and the distance between the opposed portions is set to larger value in the exterior area of the upper shield layer 74 and the lower magnetic pole layer 62 so that each of the capacitances $C_5$ and $C_6$ (shown in FIG. 4) between the lead conductors for the write head element and for the read head element has a value of 0.1 pF or less.

FIGS. 8a to 8e show characteristic graphs illustrating the relations between time and the crosstalk voltage at various values of the capacitances $C_5$ and $C_6$ between the lead conductors for the write head element and for the read head element.

As understood in the figure, even in the case where respective portions 63a and 64a and the lead conductor 67 are overlapped with each other through only the insulating layer, the both capacitances $C_5$ and $C_6$ that have values of 0.1 pF or less effect a great decrease in the crosstalk voltage generated in the read head element, which corresponds to rising and/or trailing edges of the write voltage applied to the write coil during a write operation.

The great reduction of the direct crosstalk from the write head element to the read head element, as shown in the present embodiment, can prevent a decrease in operating life of the read head element due to an enhancement of electromigration, and can also prevent a degradation of magnetic properties due to an enhancement of an interlayer diffusion of metal atoms in the case of the GMR read head element.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A composite type thin-film magnetic head, comprising:
    a write head element;
    a pair of terminal pads for said write head element;
    a pair of lead conductors for said write head element, electrically connecting said write head element to said pair of terminal pads for said write head element;
    a read head element;
    a pair of terminal pads for said read head element; and
    a pair of lead conductors for said read head element, electrically connecting said read head element to said pair of terminal pads for said read head element,
    said pair of lead conductors for said write head element and said pair of lead conductors for said read head element, formed into patterns where said pair of lead conductors for said write head element and said pair of lead conductors for said read head element have overlapped portions with each other only through an insulating layer, and each capacitance between the lead conductor for said write head element and the lead conductor for said read head element has a value of 0.1 pF or less.

2. The composite type thin-film magnetic head as claimed in claim 1, wherein an area of said overlapped portions and a distance between said overlapped portions are set so that capacitances between each of said lead conductors for said write head element and said lead conductor for said read head element have values of 0.1 pF or less.

3. The composite type thin-film magnetic head as claimed in claim 1, wherein said read head element is a magnetoresistive read head element in which a sense current flows in a direction parallel with surfaces of layers of said element.

4. The composite type thin-film magnetic head as claimed in claim 3, wherein said magnetoresistive read head element is a giant magnetoresistive read head element.

5. The composite type thin-film magnetic head as claimed in claim 1, wherein said write head element is an inductive write head element.

* * * * *